US012621790B2

(12) United States Patent
Miao et al.

(10) Patent No.: US 12,621,790 B2
(45) Date of Patent: May 5, 2026

(54) POSITIONING METHOD, DEVICE, APPARATUS AND READABLE STORAGE MEDIUM

(71) Applicant: DATANG MOBILE COMMUNICATIONS EQUIPMENT CO., LTD., Beijing (CN)

(72) Inventors: Deshan Miao, Beijing (CN); Shaoli Kang, Beijing (CN); Bin Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 383 days.

(21) Appl. No.: 18/039,927

(22) PCT Filed: Nov. 15, 2021

(86) PCT No.: PCT/CN2021/130605
§ 371 (c)(1),
(2) Date: Jun. 1, 2023

(87) PCT Pub. No.: WO2022/134933
PCT Pub. Date: Jun. 30, 2022

(65) Prior Publication Data
US 2024/0049159 A1    Feb. 8, 2024

(30) Foreign Application Priority Data
Dec. 23, 2020    (CN) ......................... 202011535007.5

(51) Int. Cl.
*H04W 64/00* (2009.01)
*G01S 19/25* (2010.01)
(Continued)

(52) U.S. Cl.
CPC .......... *H04W 64/00* (2013.01); *G01S 19/256* (2013.01); *G01S 19/258* (2013.01); *H04J 3/06* (2013.01); *H04W 84/06* (2013.01)

(58) Field of Classification Search
CPC ..... H04W 64/00; H04W 84/06; G01S 19/256; G01S 19/258; H04J 3/06
See application file for complete search history.

(56) References Cited

U.S. PATENT DOCUMENTS

| | | | | |
|---|---|---|---|---|
| 2006/0238418 A1* | 10/2006 | Monnerat | ............. | G01S 19/258 342/357.45 |
| 2008/0316091 A1* | 12/2008 | Wigren | ................. | G01S 19/256 701/472 |

(Continued)

FOREIGN PATENT DOCUMENTS

| | | | | |
|---|---|---|---|---|
| CA | 3125369 A1 * | 7/2020 | .......... | H04W 56/006 |
| CN | 101375174 A | 2/2009 | | |

(Continued)

OTHER PUBLICATIONS

Office action and search report in Chinese patent application No. 202011535007.5, issued on Mar. 31, 2025.

(Continued)

*Primary Examiner* — Khai M Nguyen
(74) *Attorney, Agent, or Firm* — Ladas & Parry, LLP

(57) ABSTRACT

The present disclosure discloses a positioning method, device, apparatus and a readable storage medium. The method includes: performing time synchronization with a satellite network; determining position information of a satellite; receiving a downlink positioning signal sent by a network device of the satellite network; determining a transmission delay between the satellite and the terminal according to a time synchronization result and the downlink positioning signal; determining position information of the (Continued)

start performing time synchronization with a satellite network ⟋ 101 determining position information of a satellite ⟋ 102 receiving a downlink positioning signal sent by a network device of the satellite network ⟋ 103 determining a transmission delay between the satellite and the terminal according to a time synchronization result and a downlink positioning signal ⟋ 104 determining the position information of the terminal according to the transmission delay and the position information of the satellite ⟋ 105 end terminal according to the transmission delay and the position information of the satellite.

18 Claims, 5 Drawing Sheets

(51) Int. Cl.
    *H04J 3/06*         (2006.01)
    *H04W 84/06*       (2009.01)

(56) References Cited

U.S. PATENT DOCUMENTS

| | | | | |
|---|---|---|---|---|
| 2014/0002304 | A1 | 1/2014 | Wei et al. | |
| 2014/0077991 | A1 | 3/2014 | Bar-Sever | |
| 2020/0267672 | A1* | 8/2020 | Chien | H04W 56/0055 |
| 2021/0297147 | A1* | 9/2021 | Qaise | H04B 7/18539 |
| 2021/0337491 | A1 | 10/2021 | Xu et al. | |
| 2022/0046679 | A1* | 2/2022 | Yeo | H04W 72/1273 |
| 2024/0137878 | A1* | 4/2024 | Frederiksen | H04W 52/50 |

FOREIGN PATENT DOCUMENTS

| | | | | |
|---|---|---|---|---|
| CN | 104765047 | A | 7/2015 | |
| CN | 110418402 | A | 11/2019 | |
| CN | 111417186 | A | 7/2020 | |
| CN | 111953442 | A | 11/2020 | |
| EP | 0871300 | B1 | 8/2001 | |
| KR | 20220037732 | A * | 3/2022 | H04W 72/23 |
| WO | 2014168537 | A1 | 10/2014 | |
| WO | 2020/074747 | A1 | 4/2020 | |

OTHER PUBLICATIONS

Extended European Patent Search Report issued on Jun. 14, 2024 for European Patent Application No. 21908933.1.

Nokia et al. "UE Positioning in NTN", 3GPP TSG RAN WG1 Meeting #96bis, R1-1904665, 3D Generation Partnership Project (3GPP), Xi'an, China, Apr. 8-12, 2019.

International Search Report for PCT Application No. PCT/CN2021/130605 issued on Feb. 10, 2022 and its English Translation provided by WIPO.

Written Opinion for PCT Application No. PCT/CN2021/130605 issued on Feb. 10, 2022 and its English Translation provided by WIPO.

International Preliminary Report on Patentability for PCT Application No. PCT/CN2021/130605 issued on Jun. 13, 2023 and its English Translation provided by WIPO.

Office action from corresponding Indian Patent Application No. 202347037448 dated Nov. 13, 2025.

\* cited by examiner

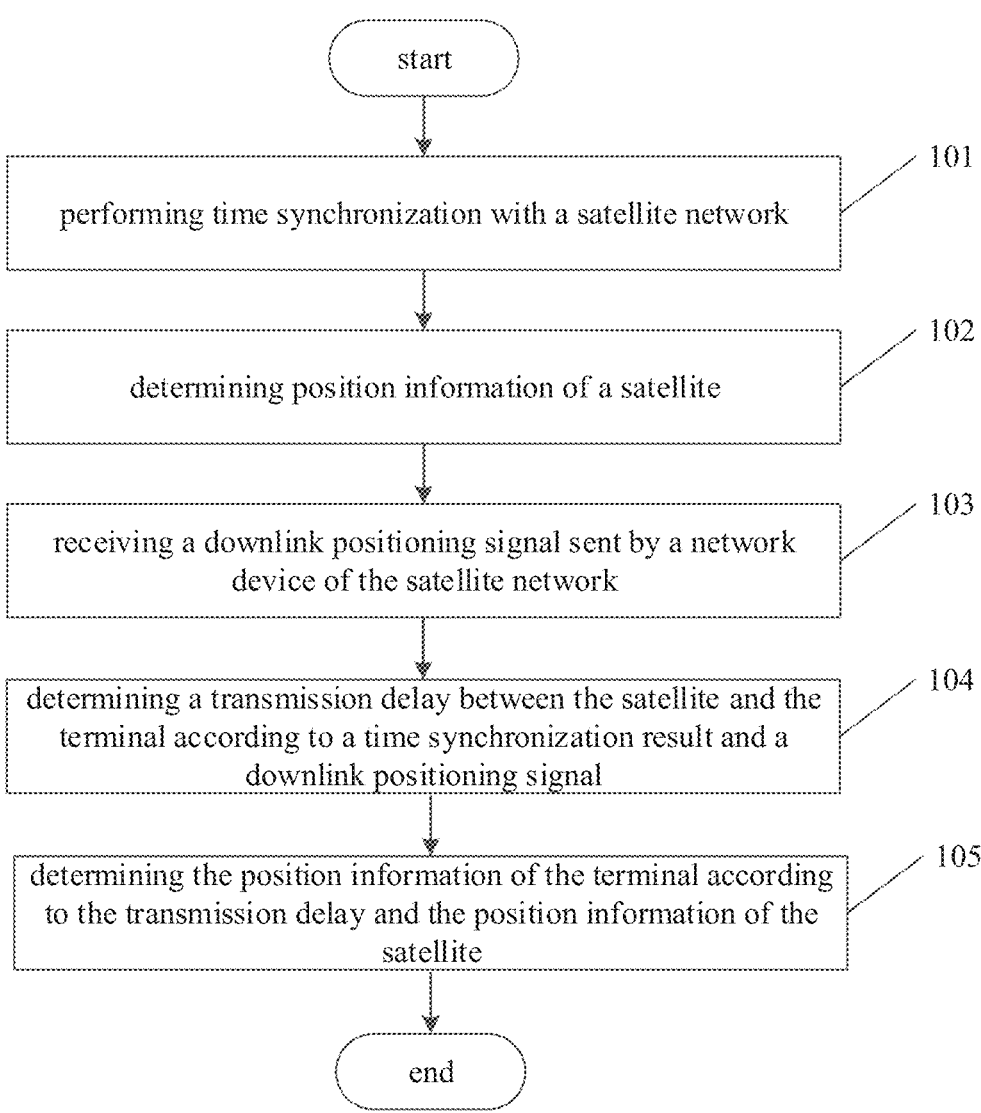

start performing time synchronization with a satellite network — 101 determining position information of a satellite — 102 receiving a downlink positioning signal sent by a network device of the satellite network — 103 determining a transmission delay between the satellite and the terminal according to a time synchronization result and a downlink positioning signal — 104 determining the position information of the terminal according to the transmission delay and the position information of the satellite — 105 end

FIG. 1

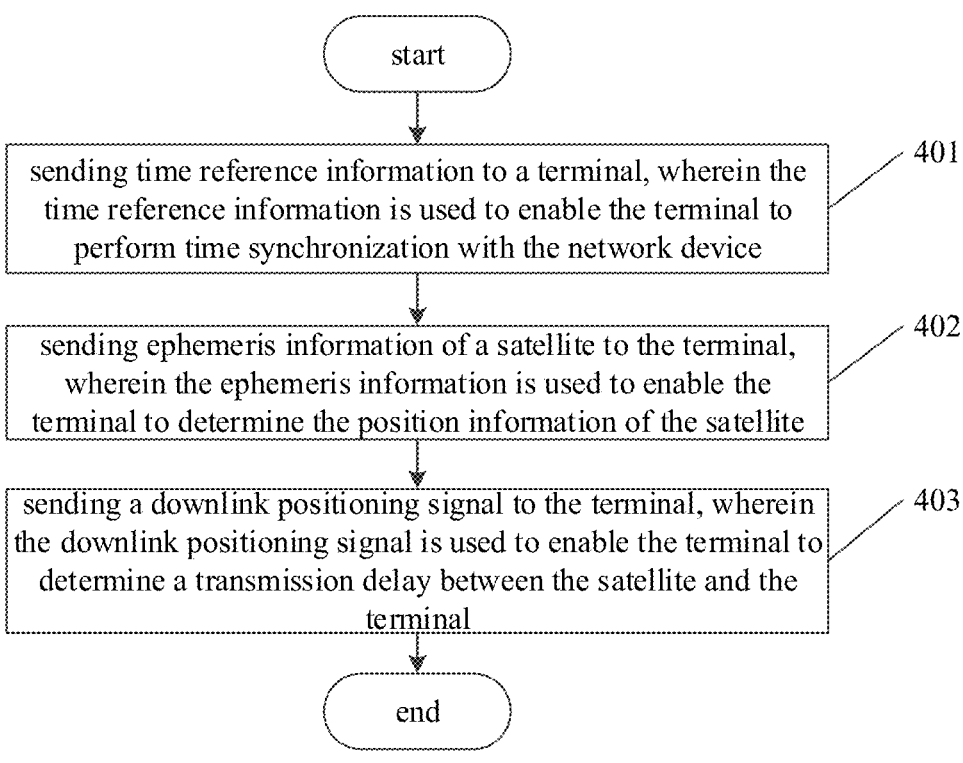

start sending time reference information to a terminal, wherein the
time reference information is used to enable the terminal to
perform time synchronization with the network device — 401 sending ephemeris information of a satellite to the terminal,
wherein the ephemeris information is used to enable the
terminal to determine the position information of the satellite — 402 sending a downlink positioning signal to the terminal, wherein
the downlink positioning signal is used to enable the terminal to
determine a transmission delay between the satellite and the
terminal — 403 end

FIG. 4

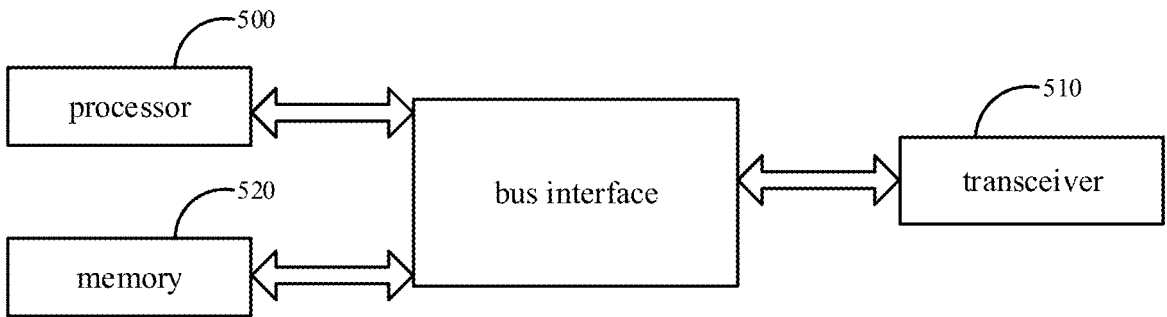

processor — 500 bus interface transceiver — 510 memory — 520

FIG. 5

POSITIONING METHOD, DEVICE, APPARATUS AND READABLE STORAGE MEDIUM

CROSS-REFERENCE TO RELATED APPLICATIONS

The present application is the U.S. national phase of PCT Application PCT/CN2021/130605 filed on Nov. 15, 2021, which claims a priority to Chinese patent application No. CN202011535007.5 filed on Dec. 23, 2020, the disclosures of which are incorporated in their entireties by reference herein.

TECHNICAL FIELD

The present disclosure relates to the field of communication technology, in particular to a positioning method, device, apparatus and a readable storage medium.

BACKGROUND

With the widespread deployment of satellite communication systems, visible satellite resources are increasing gradually. Due to the all-day service of communication satellites, it brings convenience to the use of communication satellites for positioning services.

In terrestrial mobile communications, positioning services based on communication systems are very common. The positioning technology in the mobile communication system basically maintains integration and compatibility with the design of the terrestrial mobile communication system, and the positioning module and communication module of the terminal are integrated together. However, the base station of the network device of the terrestrial mobile communication system is stationary, while the satellite is moving, and it is difficult for the terminal to observe multiple satellites at the same time, resulting in the difficulty to obtain multiple measurements at the same time, and the distance between the base station and the user terminal is relatively short, thus the positioning technology is not suitable for directly applying to the satellite systems.

In terms of satellite positioning, there are various mature satellite navigation systems such as Global Positioning System (GPS) positioning system and Beidou navigation and positioning system in the industry. In satellite positioning technology, positioning technologies such as pseudo code and carrier phase tracking are used, which relies on continuous satellite signal transmission, and the terminal obtains exact position information based on satellite signal capture and long-term signal tracking and processing. However, the frequency band, signal system and positioning mechanism used in satellite positioning technology are all specially designed, without considering the compatibility with the communication system. Therefore, the data transmission efficiency of general navigation and positioning satellites is low, and it is not suitable for ordinary data communication services.

Therefore, in the related art, separate navigation and positioning satellites and separate communication satellites make the technical cost too high, resulting in a waste of satellite resources.

SUMMARY

The present disclosure aims to provide a positioning method, a device, an apparatus and a readable storage medium, so as to save the satellite resources.

In a first aspect, an embodiment of the present disclosure provides a position method, applied to a terminal, and including: performing time synchronization with a satellite network; determining position information of a satellite; receiving a downlink positioning signal sent by a network device of the satellite network; determining a transmission delay between the satellite and the terminal according to a time synchronization result and the downlink positioning signal; determining position information of the terminal according to the transmission delay and the position information of the satellite.

In an embodiment of the present disclosure, the performing time synchronization with a satellite network includes: receiving time reference information sent by the network device through a broadcast message or a dedicated signaling; calibrating a reference time of a local clock and/or a clock frequency of the local clock of the terminal according to the time reference information.

In an embodiment of the present disclosure, the time reference information includes a preset system frame number (SFN) index and time boundary information corresponding to the SFN index.

In an embodiment of the present disclosure, the calibrating the reference time of the local clock of the terminal according to the time reference information includes: obtaining the boundary information corresponding to the SFN index according to network reference time information specified by the network device; determining SFN time boundary information corresponding to the local clock of the terminal according to the SFN index; determining a time offset value according to the boundary information corresponding to the SFN index and the SFN time boundary information corresponding to the terminal; calibrating the reference time of the local clock of the terminal according to the time offset value.

In an embodiment of the present disclosure, the calibrating the clock frequency of the local clock of the terminal according to the time reference information, includes: obtaining a first time T1 corresponding to the SFN index N1 of the reference time of the terminal, and obtaining a second time T2 corresponding to the SFN index N2 of the reference time of the terminal; comparing time difference information between T2 and T1 with time difference information between a reference time corresponding to the SFN index N2 and a reference time corresponding to the SFN index N1 of the network device, to adjust the clock frequency of the local clock of the terminal.

In an embodiment of the present disclosure, the method further includes: calculating distance change information between T2 and T1 due to the movement of the satellite according to orbital parameter information of the satellite; calculating a transmission time difference based on the distance change information; calibrating the clock frequency of the local clock according to the transmission time difference.

In an embodiment of the present disclosure, the determining the position information of the satellite includes: receiving ephemeris information of the satellite or satellite position indication information sent by the network device; determining the position information of the satellite according to the ephemeris information or the satellite position indication information.

In an embodiment of the present disclosure, the determining the transmission delay between the satellite and the terminal according to a time synchronization result and the downlink positioning signal includes: determining a starting time of a sending time of the downlink positioning signal;

determining a local receiving time point for receiving the downlink positioning signal; determining the transmission delay according to a time difference between the starting time and the local receiving time point.

In an embodiment of the present disclosure, the determining the transmission delay according to the time difference between the starting time and the local receiving time point comprises: if a sending point of the downlink positioning signal is a ground gateway station, the transmission delay being equal to the time difference between the starting time and the local receiving time point minus the transmission delay between the satellite and the ground gateway station; if the sending point of the downlink positioning signal is the satellite, the transmission delay being equal to the time difference between the starting time and the local receiving time point.

In an embodiment of the present disclosure, before the determining transmission delay according to the time difference between the starting time and the local receiving time point, the method further comprises: obtaining a preset signal processing delay; the determining the transmission delay according to the time difference between the starting time and the local receiving time point includes: calculating a first difference between the local receiving time point and the starting time, and calculating a second difference between the first difference and the signal processing delay; the second difference being used as the transmission delay.

In an embodiment of the present disclosure, the downlink positioning signal comprises one of the following signals: a positioning reference signal; a broadcast signal; a downlink reference signal; a synchronization signal; a downlink data transmission signal.

The method further includes: receiving configuration information sent by the network device, wherein the configuration information is used to configure one or more time measurement windows; the transmission delay including multiple transmission delays between the terminal and the same satellite obtained at multiple times within one time measurement window according to the configuration information, and the position information of the satellite including the position information of the satellite at the multiple times; or the transmission delay including multiple transmission delays between the terminal and the multiple satellites obtained at multiple times within multiple time measurement windows according to the configuration information, the position information of the satellite including position information of the multiple satellites at the multiple times.

The method further includes: sending the transmission delay between the satellite and the terminal to the network device.

In a second aspect, an embodiment of the present disclosure provides a positioning method, performed by a network device in a satellite network, comprising: sending time reference information to a terminal, wherein the time reference information is used to enable the terminal to perform time synchronization with the network device; sending ephemeris information of a satellite to the terminal, wherein the ephemeris information is used to enable the terminal to determine the position information of the satellite; sending a downlink positioning signal to the terminal, wherein the downlink positioning signal is used to enable the terminal to determine a transmission delay between the satellite and the terminal.

In an embodiment of the present disclosure, the time reference information includes a preset SFN index and time boundary information corresponding to the SFN index; the sending time reference information to the terminal includes: sending the time reference information to the terminal through a broadcast message or a dedicated signaling.

In an embodiment of the present disclosure, the method further includes: sending configuration information to the terminal, wherein the configuration information is used to configure one or more time measurement windows, to instruct the terminal to measure signals of multiple satellites within one time measurement window, to obtain position information of multiple satellites at multiple times, and multiple transmission delays between the multiple satellites and the terminal; or instruct the terminal to measure a signal of a same satellite through multiple time measurement windows, to obtain the position of the satellite at multiple times, and the transmission delay between the terminal and the satellite at the multiple times.

In an embodiment of the present disclosure, the method further includes: receiving the transmission delay between the satellite and the terminal sent by the terminal, and determining the position information of the terminal based on the transmission delay and the position information of the satellite.

In a third aspect, an embodiment of the present disclosure provides a positioning device, applied to a terminal, including a memory, a transceiver, and a processor: the memory is used to store computer programs; the transceiver is used to send and receive data under the control of the processor; the processor is used to read the computer programs in the memory and perform the following operations: performing time synchronization with a satellite network; determining position information of a satellite; receiving a downlink positioning signal sent by a network device of the satellite network; determining a transmission delay between the satellite and the terminal according to a time synchronization result and the downlink positioning signal; determining position information of the terminal according to the transmission delay and the position information of the satellite.

In an embodiment of the present disclosure, the performing time synchronization with a satellite network includes: receiving time reference information sent by the network device through a broadcast message or a dedicated signaling; calibrating a reference time of a local clock and/or a clock frequency of the local clock of the terminal according to the time reference information.

In an embodiment of the present disclosure, the time reference information includes a preset SFN index and time boundary information corresponding to the SFN index.

In an embodiment of the present disclosure, the calibrating the reference time of the local clock of the terminal according to the time reference information includes: obtaining the boundary information corresponding to the SFN index according to network reference time information specified by the network device; determining SFN time boundary information corresponding to the local clock of the terminal according to the SFN index; determining a time offset value according to the boundary information corresponding to the SFN index and the SFN time boundary information corresponding to the terminal; calibrating the reference time of the local clock of the terminal according to the time offset value.

In an embodiment of the present disclosure, the calibrating the clock frequency of the local clock of the terminal according to the time reference information, includes: obtaining a first time T1 corresponding to the SFN index N1 of the reference time of the terminal, and obtaining a second time T2 corresponding to the SFN index N2 of the reference time of the terminal; comparing time difference information between T2 and T1 with time difference information between a reference time corresponding to the SFN index N2 and a reference time corresponding to the SFN index N1 of the network device, to adjust the clock frequency of the local clock of the terminal.

In an embodiment of the present disclosure, the processor is further configured to: calculate distance change information between T2 and T1 due to the movement of the satellite according to orbital parameter information of the satellite; calculate a transmission time difference based on the distance change information; calibrate the clock frequency of the local clock according to the transmission time difference.

In an embodiment of the present disclosure, the determining the position information of the satellite includes: receiving ephemeris information of the satellite or satellite position indication information sent by the network device; determining the position information of the satellite according to the ephemeris information or the satellite position indication information.

In an embodiment of the present disclosure, the determining the transmission delay between the satellite and the terminal according to a time synchronization result and the downlink positioning signal includes: determining a starting time of a sending time of the downlink positioning signal; determining a local receiving time point for receiving the downlink positioning signal; determining the transmission delay according to a time difference between the starting time and the local receiving time point.

In an embodiment of the present disclosure, the processor is further configured to: if a sending point of the downlink positioning signal is a ground gateway station, the transmission delay being equal to the time difference between the starting time and the local receiving time point minus the transmission delay between the satellite and the ground gateway station; if the sending point of the downlink positioning signal is the satellite, the transmission delay being equal to the time difference between the starting time and the local receiving time point.

In an embodiment of the present disclosure, the processor is further configured to: before the determining transmission delay according to the time difference between the starting time and the local receiving time point, obtain a preset signal processing delay; calculate a first difference between the local receiving time point and the starting time, and calculate a second difference between the first difference and the signal processing delay; the second difference being used as the transmission delay.

In an embodiment of the present disclosure, the downlink positioning signal comprises one of the following signals: a positioning reference signal; a broadcast signal; a downlink reference signal; a synchronization signal; a downlink data transmission signal.

In an embodiment of the present disclosure, the processor is further configured to: receive configuration information sent by the network device, wherein the configuration information is used to configure one or more time measurement windows; the transmission delay including multiple transmission delays between the terminal and the same satellite obtained at multiple times within one time measurement window according to the configuration information, and the position information of the satellite including the position information of the satellite at the multiple times; or the transmission delay including multiple transmission delays between the terminal and the multiple satellites obtained at multiple times within multiple time measurement windows according to the configuration information, the position information of the satellite including position information of the multiple satellites at the multiple times.

In an embodiment of the present disclosure, the processor is further configured to: send the transmission delay between the satellite and the terminal to the network device.

In a fourth aspect, an embodiment of the present disclosure provides a positioning device, applied to a network device in a satellite network, comprising a memory, a transceiver, and a processor, wherein the memory is used to store computer programs; the transceiver is used to send and receive data under the control of the processor; the processor is used to read the computer programs in the memory and perform the following operations: sending time reference information to a terminal, wherein the time reference information is used to enable the terminal to perform time synchronization with the network device; sending ephemeris information of a satellite to the terminal, wherein the ephemeris information is used to enable the terminal to determine the position information of the satellite; sending a downlink positioning signal to the terminal, wherein the downlink positioning signal is used to enable the terminal to determine a transmission delay between the satellite and the terminal.

In an embodiment of the present disclosure, the time reference information includes a preset SFN index and time boundary information corresponding to the SFN index; the processor is further configured to: send the time reference information to the terminal through a broadcast message or a dedicated signaling.

In an embodiment of the present disclosure, the processor is further configured to: send configuration information to the terminal, wherein the configuration information is used to configure one or more time measurement windows, to instruct the terminal to measure signals of multiple satellites within one time measurement window, to obtain position information of multiple satellites at multiple times, and multiple transmission delays between the multiple satellites and the terminal; or instruct the terminal to measure a signal of a same satellite through multiple time measurement windows, to obtain the position of the satellite at multiple times, and the transmission delay between the terminal and the satellite at the multiple times.

In an embodiment of the present disclosure, the processor is further configured to: receive the transmission delay between the satellite and the terminal sent by the terminal, and determine the position information of the terminal based on the transmission delay and the position information of the satellite.

In a fifth aspect, an embodiment of the present disclosure provides a positioning device, applied to a terminal, comprising: a synchronization unit, configured to perform time synchronization with a satellite network; a first determining unit, configured to determine position information of a satellite; a first receiving unit, configured to receive a downlink positioning signal sent by a network device of the satellite network; a second determination unit, configured to determine a transmission delay between the satellite and the terminal according to a time synchronization result and the downlink positioning signal; a third determining unit, configured to determine position information of the terminal according to the transmission time delay and the position information of the satellite.

In a sixth aspect, an embodiment of the present disclosure provides a positioning device, applied to a network device in a satellite network, comprising: a first sending unit, configured to send time reference information to a terminal, wherein the time reference information is used to enable the terminal to perform time synchronization with the network device; a second sending unit, configured to send ephemeris information of a satellite to the terminal, wherein the ephemeris information is used to enable the terminal to determine the position information of the satellite; a third sending unit, configured to sending a downlink positioning signal to the terminal, wherein the downlink positioning signal is used to enable the terminal to determine a transmission delay between the satellite and the terminal.

In a seventh aspect, an embodiment of the present disclosure provides a processor-readable storage medium, storing a computer program, wherein the computer program is executed by the processor to implement the steps of the positioning method.

In embodiment of the present disclosure, after the terminal performs time synchronization with the satellite network, the terminal determines the transmission delay between the satellite and the terminal according to the information of the satellite and the downlink positioning signal of the satellite network, and further determines the position information of the terminal. Therefore, in the embodiment of the present disclosure, the communication function of the satellite is used for positioning the terminal, the satellite resources are saved.

BRIEF DESCRIPTION OF THE DRAWINGS

FIG. 1 is a flowchart of the positioning method provided by an embodiment of the present disclosure;

FIG. 4 is another flowchart of the positioning method provided by an embodiment of the present disclosure;

FIG. 5 is a first structural schematic diagrams of a positioning device provided by an embodiment of the present disclosure;

DETAILED DESCRIPTION

Figure 2:
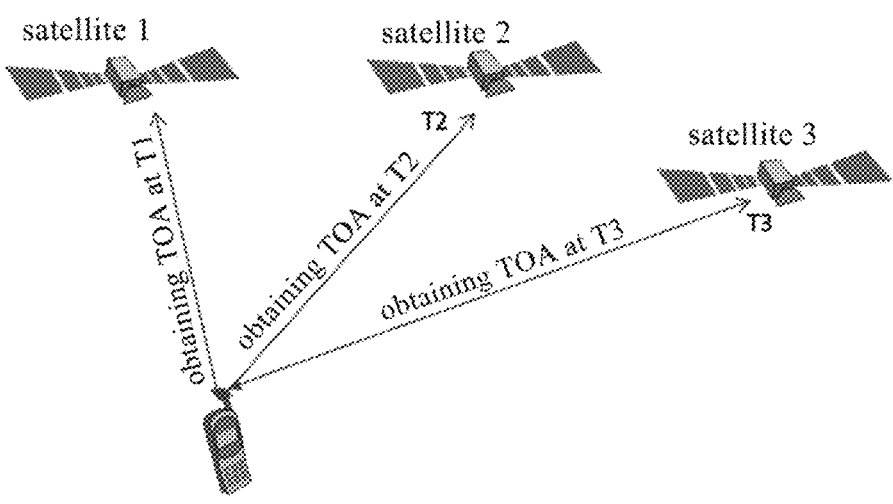
FIG. 2 shows a positioning and ranging method of a plurality of satellites.

The term "and/or" in the embodiments of the present disclosure describes the association relationship of associated objects, indicating that there may be three relationships, for example, A and/or B, which may mean: A exists alone, A and B exist simultaneously, and B exists alone. The character "/" generally indicates that the contextual objects are an "or" relationship.

The term "plurality of" in the embodiments of the present application refers to two or more, and other quantifiers are similar.

The technical solutions in the embodiments of the present disclosure will be clearly and completely described below in conjunction with the accompanying drawings in the embodiments of the present application. Obviously, the described embodiments are only some of the embodiments of the present disclosure, not all of them. Based on the embodiments in the present disclosure, all other embodiments obtained by persons of ordinary skill in the art without making creative efforts belong to the scope of protection of the present disclosure.

Embodiments of the present disclosure provide a positioning method, device, apparatus and a readable storage medium, to save satellite resources. Among them, the method and the device are conceived based on the same disclosure. Since the principle of solving problems of the method and the device is similar, the implementation of the device and the method can be referred to each other, and the repetition will not be repeated.

The terminal involved in the embodiments of the present application may be a device that provides voice and/or data connectivity to users, a handheld device with a wireless connection function, or other processing devices connected to a wireless modem. In different systems, the name of the terminal may be different. For example, in a 5G system, the terminal may be called user equipment (UE). Wireless terminal equipment can communicate with one or more core networks (CN) via a radio access network (AN), and wireless terminal can be mobile terminal, such as mobile phones (or called "cellular" telephones) and computers with mobile terminal, such as portable, pocket, hand-held, computer built-in or vehicle-mounted mobile devices, which exchange voice and/or data with the radio access network. For example, Personal Communication Service (PCS) phones, cordless phones, Session Initiated Protocol (SIP) phones, Wireless Local Loop (WLL) stations, Personal Digital Assistant (PDA) and other devices. Wireless terminal can also be called system, subscriber unit, subscriber station, mobile station, mobile, remote station, access point, a remote terminal, an access terminal, a user terminal, a user agent, and a user device, which are not limited in this embodiment of the present disclosure.

FIG. 1 is a flowchart of a positioning method according to an embodiment of the present disclosure, which is executed by a terminal. The method includes:

Step 101, performing time synchronization with a satellite network.

The satellite network sends time reference information to the terminal through a broadcast channel, etc., and the terminal calibrates the reference time and/or clock frequency of the terminal's local clock based on the time reference information and frame timing configuration of the network, to maintain time synchronization with the network side. Specifically, in this step, the terminal may receive the time reference information sent by the network device through a broadcast message or dedicated signaling, and then, according to the time reference information, and calibrate the reference time and/or the clock frequency of the local clock of the terminal.

Wherein, the time reference information may include absolute time information or relative time information relative to a certain time point. For example, the time reference information includes a preset System Frame Number (SFN) index and time boundary information corresponding to the SFN index.

When calibrating the reference time of the local clock of the terminal according to the time reference information, the terminal may first obtain boundary information corresponding to the SFN index according to the network reference time information specified by the network device. Then, the terminal determines the SFN time boundary information corresponding to the local clock of the terminal according to the SFN index, and determines a time offset value according to the boundary information corresponding to the SFN index and the SFN time boundary information corresponding to the terminal. Afterwards, the terminal calibrates the reference time of the local clock of the terminal according to the time offset value. For example, the reference time of the local clock and the time offset value can be used for calculation (such as subtracting the time offset value from the reference time of the local clock) to obtain the calibrated reference time of the local clock.

When calibrating the clock frequency of the local clock of the terminal according to the time reference information, the terminal obtains a first time T1 corresponding to the SFN index N1 of the reference time of the terminal, and obtains a second time T2 corresponding to the SFN index N2 of the reference time of the terminal; compares the time difference information between the T2 and T1 with the time difference information between the reference time corresponding to the SFN index N2 and the reference time corresponding to the SFN index N1 of the network device, to adjust the clock frequency of the local clock of the terminal, so as to eliminate the error of the local crystal oscillator, so that the count of the local clock is consistent with the count of the satellite clock.

In order to further improve the detection accuracy, it is necessary to consider the movement of the satellite within the time T2–T1, and eliminate the time deviation caused by the movement of the satellite in the time interval T2–T1 based on the trajectory of the satellite movement. Specifically, according to the orbit parameter information of the satellite, the distance change information between T2 and T1 due to the movement of the satellite is calculated, then the transmission time difference based on the distance change information is calculated, and the clock frequency of the local clock is calculated according to the transmission time difference.

Step 102, determining position information of a satellite.

In this step, the ephemeris information of the satellite or satellite position indication information sent by the network device is received, and then the position information of the satellite is determined according to the ephemeris information or the satellite position indication information.

Ephemeris information refers to satellite orbit information, including satellite position-related ephemeris information and satellite orbit parameter information. The terminal can directly obtain satellite instantaneous position information based on ephemeris information, or derive satellite real-time position information based on ephemeris information. Specifically, ephemeris information can usually be expressed in two ways: one is Kepler operating parameters of the satellite, and the other is explicit satellite position information. After the terminal obtains the Kepler operating parameters, the terminal needs to predict the orbital position based on the predetermined satellite operating characteristics, so as to calculate the satellite position at different times; while the explicit satellite position information directly indicates the terminal about the 3D position separation of the position, and indicates the terminal about the movement speed information of the satellite, including the movement speed and movement direction. After obtaining the position and movement information, the operating orbital position of the satellite between two notifications can be inferred based on the operating characteristics.

Specifically, the information parameters of the first expression way include the contents shown in Table 1:

TABLE 1

| keplerToe | ephemeris reference time |
| keplerW | near-earth orbit angular distance |

TABLE 1-continued

| keplerDeltaN | average motion angular velocity correction value |
| keplerM0 | mean anomaly |
| keplerOmegaDot | change rate of orbital ascending node right ascension with time |
| keplerE | orbital eccentricity |
| keplerIDot | change rate of orbital inclination with time |
| keplerAPowerHalf | square root of the semi-major axis of the orbit |
| keplerI0 | orbital inclination |
| keplerOmega0 | orbital ascending node right ascension |
| keplerCrs | sinusoidal harmonic correction amplitude of orbital radius |
| keplerCis | sinusoidal harmonic correction amplitude of orbital inclination |
| keplerCus | sine harmonic correction amplitude of ascending node angular distance |
| keplerCrc | cosine harmonic correction amplitude of orbital radius |
| keplerCic | cosine harmonic correction amplitude of orbital inclination |
| keplerCuc | cosine harmonic correction amplitude of ascending node angular distance |

After obtaining the above parameters, the terminal can calculate the moving track of the satellite, so as to obtain the real-time orbital position of the satellite.

The information parameters of the second expression way include: position information (Px, Py, Pz), time information and velocity information (Vx, Vy, Vz), and further include the second-order component and third-order component of the velocity, etc., the time information represents the effective time corresponding to the position information. After obtaining the position information, the terminal calculates the orbit model, and estimates the satellite position information after the effective time based on the velocity and direction information in real time. Since the effective time of the velocity and direction information is relatively short, satellite position estimation based on the indication information of the second expression way is mostly used for local time derivation.

Wherein, the satellite position indication information may be, for example, the moving speed of the satellite, orbital operating parameters, moving track, specific position of the satellite, and the like.

In the embodiment of the present disclosure, the satellite network may include a satellite network with a transparent forwarding capability or a satellite network with on-board processing capabilities.

Step 103, receiving a downlink positioning signal sent by a network device of the satellite network.

Wherein, the downlink positioning signal may include one of the following signals: a positioning reference signal; a broadcast signal; a downlink reference signal; a synchronization signal; a downlink data transmission signal. The sending pattern or time interval of the downlink positioning signal can be notified to the terminal in advance.

Step 104: Determining a transmission delay between the satellite and the terminal according to a time synchronization result and a downlink positioning signal.

The transmission delay is the signal transmission time between the satellite and the terminal, also referred to as the time difference between sending and receiving signals (Time of arrival, TOA).

In this step, the terminal determines the start time of the sending time of the downlink positioning signal, and determines the local receiving time point of receiving the downlink positioning signal. Then, the transmission delay is determined according to the time difference between the starting time and the local receiving time point.

Specifically, after synchronizing with the network time, the terminal obtains the start time of the transmission time of the downlink positioning signal based on time information such as the time domain transmission frame number, slot index, and symbol index of the downlink positioning signal. After detecting the downlink positioning signal, the terminal determines the local receiving time point for receiving the downlink positioning signal, and then determines the transmission delay between the satellite and the terminal based on the time difference between sending and receiving the downlink positioning signal.

In order to further improve the positioning accuracy, the radio frequency signal processing delay of the network and the processing delay of the terminal need to be considered in the calculation process of the transmission delay. Then, the terminal can obtain the preset signal processing delay. When calculating the transmission delay, the terminal calculates a first difference between the local receiving time point and the starting time, and calculates a second difference between the first difference and the signal processing delay value, and use the second difference as the transmission delay.

Assume that the time point when the network device of the satellite network sends the downlink positioning signal is T00, and the time point when the terminal receives the downlink positioning signal is T01. The processing delay of the network device and the terminal is delta_t, and the transmission delay between the satellite and the terminal needs to be subtracted from the signal processing delay, that is, TOA=T01−T00−delta_t. This delta_t can be obtained in advance when the network device and terminal perform the measurement, or a benchmark deviation can be specified, that is, assuming that the nominal delta_t is equal to a threshold value, the index of the device must not deviate by a predetermined value relative to this threshold value, this predetermined value is the inherent error accuracy of the time detection.

In practical applications, the satellite network may include the satellites having transparent forwarding capabilities and satellites with on-board processing capabilities.

When the satellite works in the transparent forwarding mode, the sending point of the downlink positioning signal is the ground gateway station, but the transmission delay for positioning corresponds to the distance between the satellite and the terminal, so the timing point for positioning calculation is in the satellite. Then, in order to improve the accuracy of positioning, here, if the sending point of the downlink positioning signal is a ground gateway station, the transmission delay is equal to the time difference between the starting time and the local receiving time point minus the transmission delay between the satellite and the ground gateway station. Wherein, the transmission time delay between the satellite and the ground gateway station may also be determined based on the time difference between sending and receiving of the downlink positioning signal by the satellite. When the satellite works in the on-board processing mode, and the sending point of the downlink positioning signal is the satellite, then the transmission delay is equal to the time difference between the starting time and the local receiving time point.

Step 105. Determining the position information of the terminal according to the transmission delay and the position information of the satellite.

In the embodiment of the present disclosure, after the terminal is synchronized in time with the satellite network, the terminal determines the transmission delay between the satellite and the terminal according to the information of the satellite and the downlink positioning signal of the satellite network, and then determines the position information of the terminal. It can be seen that, in the embodiment of the present disclosure, the communication function of the satellite is used for positioning the terminal, therefore, the solution of the embodiment of the present disclosure saves satellite resources.

In addition, the terminal may also receive configuration information sent by the network device, the configuration information is used to configure one or more time measurement windows. Correspondingly, the transmission delay includes multiple transmission delays between the terminal and the same satellite obtained at multiple times within a time measurement window according to the configuration information, and the position information of the satellite include the position information of the satellite at the multiple times; or the transmission delay includes multiple transmission delays between the terminal and the multiple satellites obtained at multiple times within multiple time measurement windows according to the configuration information, the satellite position information includes position information of the multiple satellites at the multiple times.

That is to say, the terminal can obtain the position information of multiple satellites and the transmission delay between multiple satellites at the same time, and calculate the position information of the terminal; or the terminal can measure the position information of the satellite in different time periods for the same satellite and the transmission time delay with the same satellite, and calculate the position information of the terminal.

In addition, the terminal may also send the transmission time delay between the satellite and the terminal to the network device, so that the network device can estimate the position of the terminal.

For the measurement of transmission delay, when the terminal can measure the positioning signals of multiple satellites in a pre-configured time window, the terminal completes the measurement of transmission delay through one window measurement, otherwise the terminal needs to complete multiple transmission delay measurements on multiple satellites or the same satellite in multiple different time windows.

Figure 3:
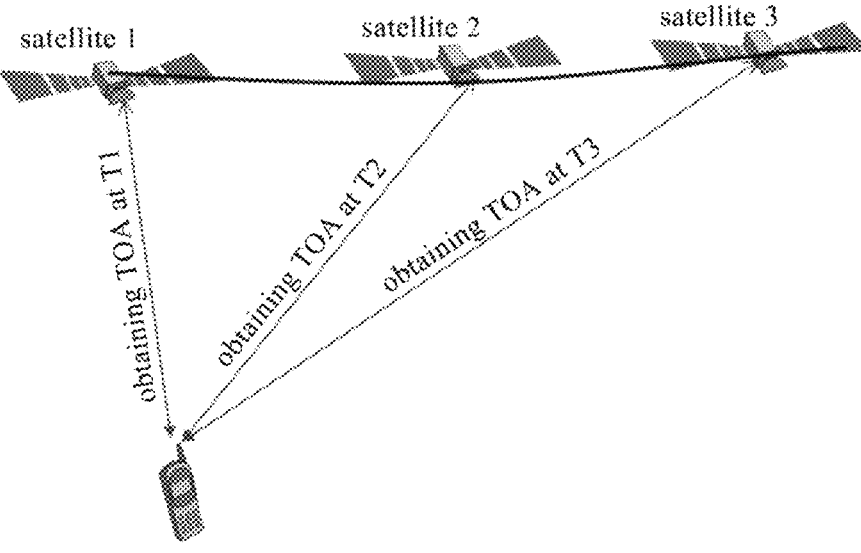
FIG. 3 shows a positioning and ranging method of a single satellite.

FIG. 2 shows the positioning and ranging method of multiple satellites. The terminal estimates the time difference of sending and receiving signals (Time of arrival, TOA) of different satellites at different times, and at the same time, the terminal obtains the satellite position when measuring TOA, and then perform positioning calculations, and finally determine the position of the terminal. FIG. 3 shows the positioning and ranging method of a single satellite. The terminal can estimate the time of arrival (TOA) and position information of the same satellite at different times, then perform positioning calculations, and finally determine the position of the terminal.

Based on the principle of three-point positioning, when the terminal obtains the position information of three satellites and the distance between each satellite and the terminal, it can calculate the position information of the terminal. The specific calculation is based on the following three equations, and then the terminal position is determined:

$$\sqrt{(X1-X0)^2+(Y1-Y0)^2+(Z1-Z0)^2}=P1; \tag{1}$$

$$\sqrt{(X2-X0)^2+(Y2-Y0)^2+(Z2-Z0)^2}=P2; \tag{2}$$

$$\sqrt{(X3-X0)^2+(Y3-Y0)^2+(Z3-Z0)^2}=P3; \tag{3}$$

(X0, Y0, Z0) is the position coordinate information of the terminal, which is the variable to be solved; the position information of the other three satellites is (X1, Y1, Z1), (X2, Y2, Z2) (X3, Y3, Z3) can be obtained based on satellite ephemeris information; P1, P2, and P3 are the distances from the three satellites to the terminal, which can be calculated based on transmission delay.

FIG. 4 is a flowchart of a positioning method according to an embodiment of the present disclosure, which is executed by a network device in a satellite network. The method includes:

Step 401: Sending time reference information to a terminal, wherein the time reference information is used to enable the terminal to synchronize in time with the network device.

Wherein, the time reference information includes a preset SFN index and time boundary information corresponding to the SFN index. Specifically, in this step, the network device may send the time reference information to the terminal through a broadcast message or dedicated signaling.

Step 402: Sending ephemeris information of the satellite to the terminal, wherein the ephemeris information is used to enable the terminal to determine the position information of the satellite.

Step 403: Sending a downlink positioning signal to the terminal, wherein the downlink positioning signal is used to enable the terminal to determine a transmission delay between the satellite and the terminal.

Wherein, the downlink positioning signal may include one of the following signals: a positioning reference signal; a broadcast signal; a downlink reference signal; a synchronization signal; a downlink data transmission signal. The sending pattern or time interval of the downlink positioning signal can be notified to the terminal in advance.

In the embodiment of the present disclosure, after the terminal is synchronized in time with the satellite network, the terminal determines the transmission delay between the satellite and the terminal according to the information of the satellite and the downlink positioning signal of the satellite network, and then determines the position information of the terminal. It can be seen that, in the embodiment of the present disclosure, the communication function of the satellite is used for positioning the terminal, therefore, the solution of the embodiment of the present disclosure saves satellite resources.

In addition, the network device may also send configuration information to the terminal, the configuration information is used to configure one or more time measurement windows, so as to instruct the terminal to measure signals of multiple satellites within one time measurement window, so as to obtain the position information of the multiple satellite at multiple times, and multiple transmission delays between the multiple satellites and the terminal, or instruct the terminal to measure the signal of the same satellite through multiple time measurement windows, so as to obtain the position of the satellite at multiple times, and the transmission delay between the terminal and the satellite at multiple times.

In addition, the network device may also receive the transmission time delay between the satellite and the terminal sent by the terminal, and determine the position information of the terminal based on the transmission time delay and the position information of the satellite.

FIG. 5 is a schematic structural diagram of a positioning device according to an embodiment of the present disclosure, applied to a network device in a satellite network, including: a transceiver 500 configured to receive and send data under the control of a processor 510.

Wherein, in FIG. 5, the bus architecture may include any number of interconnected buses and bridges, specifically various circuits of one or more processors represented by the processor 510 and the memory represented by the memory 520 are linked together. The bus architecture can also link together various other circuits such as peripherals, voltage regulators, and power management circuits, etc., which are well known in the art and therefore will not be further described herein. The bus interface provides the interface. The transceiver 500 may be a plurality of elements, including a transmitter and a receiver, providing a unit for communicating with various other devices over transmission medium, including wireless channels, wired channels, optical cables, and other transmission medium. The processor 510 is responsible for managing the bus architecture and general processing, and the memory 520 may store data used by the processor 510 when performing operations.

The processor 510 may be a central processor (CPU), an application specific integrated circuit (ASIC), a field programmable gate array (FPGA) or a complex programmable logic device (CPLD), the processor can also adopt a multi-core architecture.

Wherein, the processor 510 is configured to read the computer program in the memory and perform the following operations:

sending time reference information to a terminal, wherein the time reference information is used to enable the terminal to perform time synchronization with the network device;

sending ephemeris information of a satellite to the terminal, wherein the ephemeris information is used to enable the terminal to determine the position information of the satellite;

sending a downlink positioning signal to the terminal, wherein the downlink positioning signal is used to enable the terminal to determine a transmission delay between the satellite and the terminal.

Wherein, the time reference information includes a preset SFN index and time boundary information corresponding to the SFN index; the processor 510 is further configured to: send the time reference information to the terminal through a broadcast message or dedicated signaling.

Wherein, the processor 510 is also used to:

send configuration information to the terminal, wherein the configuration information is used to configure one or more time measurement windows, so as to instruct the terminal to measure the signals of multiple satellites within one time measurement window, so as to obtain the position information of multiple satellites at multiple times, and multiple transmission delays between the multiple satellites and the terminal, or instruct the terminal to measure the signal of the same satellite through multiple time measurement windows, so as to obtain the position of the satellite at multiple times, and the transmission delay between the terminal and the satellite at multiple times.

Wherein, the processor 510 is further configured to: receive the transmission delay between the satellite and the terminal sent by the terminal, and determine the position information of the terminal based on the transmission delay and the position information of the satellite.

What needs to be explained here is that the above-mentioned device provided by the embodiment of the present disclosure can realize all the method steps realized by the above-mentioned method embodiment, and can achieve the same technical effect. The same part and the beneficial effect are not described in detail here.

Figure 6:
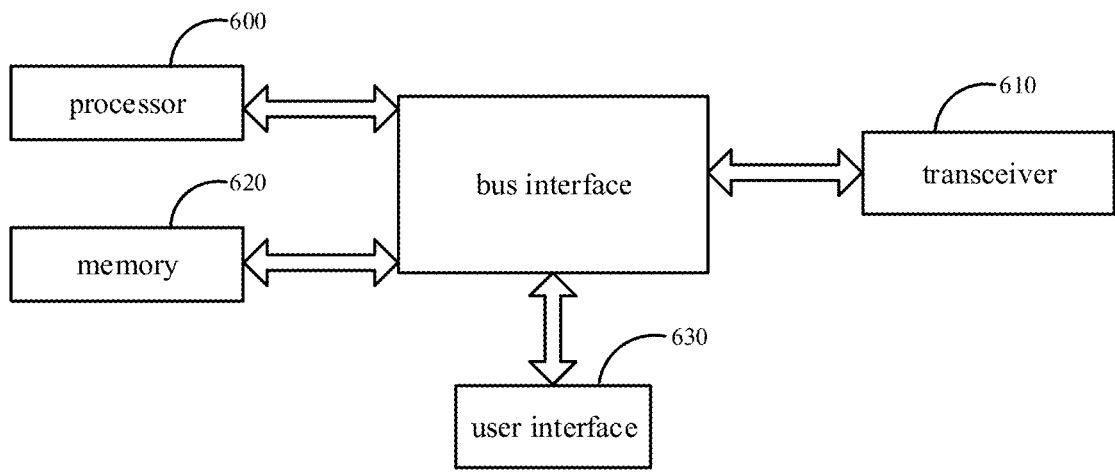
FIG. 6 is a second structural schematic diagram of the positioning device provided by the embodiment of the present disclosure.

FIG. 6 is a schematic structural diagram of a positioning device according to an embodiment of the present disclosure, which is applied to a terminal and includes: a transceiver 600 configured to receive and send data under the control of a processor 610.

Wherein, in FIG. 6, the bus architecture may include any number of interconnected buses and bridges, specifically various circuits of one or more processors represented by the processor 610 and the memory represented by the memory 620 are linked together. The bus architecture can also link together various other circuits such as peripherals, voltage regulators, and power management circuits, etc., which are well known in the art and therefore will not be further described herein. The bus interface provides the interface. Transceiver 600 may be a plurality of elements, including a transmitter and a receiver, providing means for communicating with various other devices over transmission medium, including wireless channels, wired channels, fiber optic cables, etc. For different UE, the user interface 630 may also be an interface capable of connecting externally and internally to required device, and the connected device includes but not limited to a keypad, a display, a speaker, a microphone, a joystick, and the like.

The processor 610 is responsible for managing the bus architecture and general processing, and the memory 620 may store data used by the processor 600 when performing operations.

Optionally, the processor 610 may be a CPU, ASIC, FPGA or CPLD, the processor can also adopt a multi-core architecture.

The processor is used to execute any one of the methods provided in the embodiments of the present application according to the obtained executable instructions by calling the computer program stored in the memory. The processor and memory may also be physically separated.

Wherein, the processor 610 is configured to read the computer program in the memory and perform the following operations:

performing time synchronization with a satellite network;

determining position information of a satellite;

receiving a downlink positioning signal sent by a network device of the satellite network;

determining a transmission delay between the satellite and the terminal according to a time synchronization result and a downlink positioning signal;

determining the position information of the terminal according to the transmission delay and the position information of the satellite.

Wherein, the performing time synchronization with the satellite network includes:

receiving time reference information sent by the network device through a broadcast message or dedicated signaling;

Calibrating a reference time of a local clock of the terminal and/or a clock frequency of the local clock according to the time reference information.

Wherein, the time reference information includes a preset SFN index and time boundary information corresponding to the SFN index.

Wherein, the calibrating the reference time of the local clock of the terminal according to the time reference information includes:

Obtaining the boundary information corresponding to the SFN index according to network reference time information specified by the network device;

determining the SFN time boundary information corresponding to the local clock of the terminal according to the SFN index;

Determining a time offset value according to the boundary information corresponding to the SFN index and the SFN time boundary information corresponding to the terminal;

Calibrating the reference time of the local clock of the terminal according to the time offset value.

Wherein, the calibrating the clock frequency of the local clock of the terminal is according to the time reference information, includes:

obtaining a first time T1 corresponding to the SFN index N1 of the reference time of the terminal, and obtaining a second time T2 corresponding to the SFN index N2 of the reference time of the terminal;

comparing the time difference information between the T2 and T1 with the time difference information between the reference time corresponding to the SFN index N2 and the reference time corresponding to the SFN index N1 of the network device, to adjust the clock frequency of the local clock of the terminal.

Wherein, the processor 610 is also used to:

calculate distance change information between T2 and T1 due to the movement of the satellite according to orbital parameter information of the satellite;

calculate a transmission time difference based on the distance change information;

calibrate the clock frequency of the local clock according to the transmission time difference.

Wherein, the determining the position information of the satellite includes:

receiving ephemeris information of the satellite or satellite position indication information sent by the network device;

Determining the position information of the satellite according to the ephemeris information or the satellite position indication information.

Wherein, the determining the transmission delay between the satellite and the terminal according to a time synchronization result and the downlink positioning signal includes:

determining a starting time of a sending time of the downlink positioning signal;

determining a local receiving time point for receiving the downlink positioning signal;

determining the transmission delay according to a time difference between the starting time and the local receiving time point.

Wherein, the processor 610 is also used to:

If a sending point of the downlink positioning signal is a ground gateway station, the transmission delay is equal to the time difference between the starting time and the local receiving time point minus the transmission delay between the satellite and the ground gateway station;

If the sending point of the downlink positioning signal is the satellite, the transmission delay is equal to the time difference between the starting time and the local receiving time point.

Wherein, the processor 610 is also used to:

obtain a preset signal processing delay before determining the transmission delay according to the time difference between the starting time and the local receiving time point;

calculate a first difference between the local receiving time point and the starting time, and calculate a second difference between the first difference and the signal processing delay;

The second difference is used as the transmission delay.

Wherein, the downlink positioning signal includes one of the following signals:

A positioning reference signal;

A broadcast signal;

A downlink reference signal;

A synchronization signal;

A downlink data transmission signal.

Wherein, the processor 610 is also used to:

receive configuration information sent by the network device, wherein the configuration information is used to configure one or more time measurement windows;

the transmission delay includes multiple transmission delays between the terminal and the same satellite obtained at multiple times within a time measurement window according to the configuration information, and the position information of the satellite include the position information of the satellite at the multiple times; or the transmission delay includes multiple transmission delays between the terminal and the multiple satellites obtained at multiple times within multiple time measurement windows according to the configuration information, the satellite position information includes position information of the multiple satellites at the multiple times.

Wherein, the processor 610 is further configured to: send the transmission delay between the satellite and the terminal to the network device.

What needs to be explained here is that the above-mentioned device provided by the embodiment of the present disclosure can realize all the method steps realized by the above-mentioned method embodiment, and can achieve the same technical effect. The same part and the beneficial effect are not described in detail herein.

Figure 7:
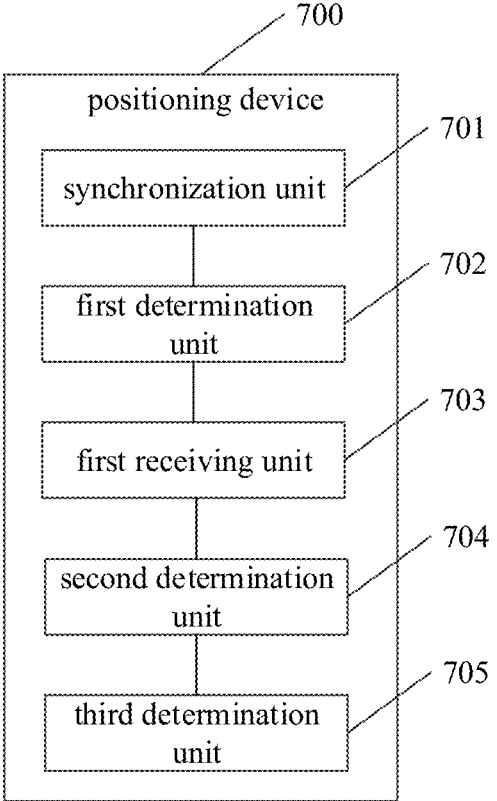
FIG. 7 is a third structural schematic diagram of the positioning device provided by the embodiment of the present disclosure.

FIG. 7 is a schematic structural diagram of a positioning device according to an embodiment of the present disclosure, applied to a terminal, including:

a synchronization unit 701, configured to perform time synchronization with a satellite network; a first determination unit 702, configured to determine position information of the satellite; a first receiving unit 703, configured to receive a downlink positioning signal sent by a network device of the satellite network; a second determination unit 704, configured to determine a transmission delay between the satellite and the terminal according to a time synchronization result and a downlink positioning signal; a third determination unit 705, configured to determine the position information of the terminal according to the transmission delay and the position information of the satellite.

Wherein, the synchronization unit may include:

a receiving subunit, configured to receive time reference information sent by the network device through a broadcast message or dedicated signaling;

a synchronization subunit, configured to calibrate a reference time of a local clock of the terminal and/or a clock frequency of the local clock according to the time reference information.

Wherein, the time reference information includes a preset SFN index and time boundary information corresponding to the SFN index.

Wherein, the synchronization subunit is configured to obtain the boundary information corresponding to the SFN index according to network reference time information specified by the network device; determine the SFN time boundary information corresponding to the local clock of the terminal according to the SFN index; determine a time offset value according to the boundary information corresponding to the SFN index and the SFN time boundary information corresponding to the terminal; calibrate the reference time of the local clock of the terminal according to the time offset value.

Wherein, the synchronization subunit is further configured to obtain a first time T1 corresponding to the SFN index N1 of the reference time of the terminal, and obtaining a second time T2 corresponding to the SFN index N2 of the reference time of the terminal; compare the time difference information between the T2 and T1 with the time difference information between the reference time corresponding to the SFN index N2 and the reference time corresponding to the SFN index N1 of the network device, to adjust the clock frequency of the local clock of the terminal.

Wherein, the synchronization subunit is further configured to calculate distance change information between T2 and T1 due to the movement of the satellite according to orbital parameter information of the satellite; calculate a transmission time difference based on the distance change information; calibrate the clock frequency of the local clock according to the transmission time difference.

Wherein, the first determination unit includes:

a receiving subunit, configured to receive ephemeris information of the satellite or satellite position indication information sent by the network device; a determination subunit, configured to determine the position information of the satellite according to the ephemeris information or the satellite position indication information.

Wherein, the second determination unit includes:

a first determination subunit, configured to determine a starting time of a sending time of the downlink positioning signal; a second determination subunit, configured to determine a local receiving time point for receiving the downlink positioning signal; a third determination subunit, configured to determine the transmission delay according to a time difference between the starting time and the local receiving time point.

Wherein, the device further includes: a first obtaining unit, configured to obtain a preset signal processing delay; a third determining subunit, configured to calculate a first difference between the local receiving time point and the starting time, and calculate a second difference between the first difference and the signal processing delay, the second difference is used as the transmission delay.

Wherein, the meaning of the downlink positioning signal is the same as that described in the foregoing embodiments.

Wherein, the device may further include: a second receiving unit, configured to receive configuration information sent by the network device, wherein the configuration information is used to configure one or more time measurement windows;

the transmission delay includes multiple transmission delays between the terminal and the same satellite obtained at multiple times within a time measurement window according to the configuration information, and the position information of the satellite include the position information of the satellite at the multiple times; or the transmission delay includes multiple transmission delays between the terminal and the multiple satellites obtained at multiple times within multiple time measurement windows according to the configuration information, the satellite position information includes position information of the multiple satellites at the multiple times.

Wherein, the device may further include: a first sending unit, configured to send the transmission delay between the satellite and the terminal to the network device.

What needs to be explained here is that the above-mentioned device provided by the embodiment of the present disclosure can realize all the method steps realized by the above-mentioned method embodiment, and can achieve the same technical effect. The same part and the beneficial effect are not described in detail here.

Figure 8:
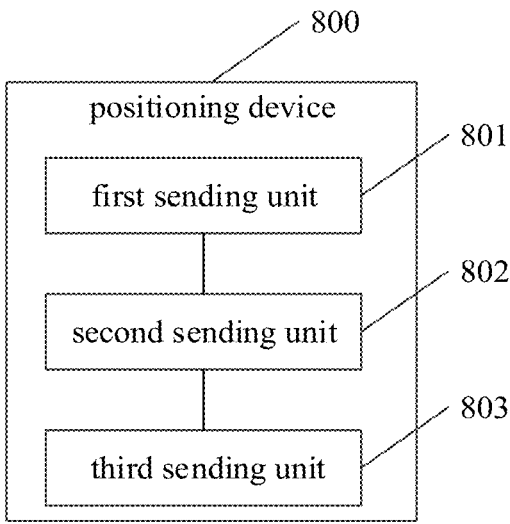
FIG. 8 is a fourth structural schematic diagram of a positioning device provided by an embodiment of the present disclosure.

FIG. 8 is a schematic structural diagram of a positioning device according to an embodiment of the present disclosure, which is applied to a network device in a satellite network, including:

a first sending unit 801, configured to send time reference information to a terminal, wherein the time reference information is used to enable the terminal to synchronize in time with the network device; a second sending unit 802, configured to send ephemeris information of the satellite to the terminal, wherein the ephemeris information is used to enable the terminal to determine the position information of the satellite; a third sending unit 803, configured to send a downlink positioning signal to the terminal, wherein the downlink positioning signal is used to enable the terminal to determine a transmission delay between the satellite and the terminal.

Wherein, the time reference information includes a preset SFN index and time boundary information corresponding to the SFN index; the first sending unit is configured to send the time reference information to the terminal through a broadcast message or dedicated signaling.

Wherein, the device further includes: a fourth sending unit, configured to send configuration information to the terminal, wherein the configuration information is used to configure one or more time measurement windows, so as to instruct the terminal to measure signals of multiple satellites within one time measurement window, so as to obtain the position information of the multiple satellite at multiple times, and multiple transmission delays between the multiple satellites and the terminal, or instruct the terminal to measure the signal of the same satellite through multiple time measurement windows, so as to obtain the position of the satellite at multiple times, and the transmission delay between the terminal and the satellite at multiple times.

Wherein, the device further includes: a first receiving unit, configured to receive the transmission time delay between the satellite and the terminal sent by the terminal, and determine the position information of the terminal based on the transmission time delay and the position information of the satellite.

What needs to be explained here is that the above-mentioned device provided by the embodiment of the present disclosure can realize all the method steps realized by the above-mentioned method embodiment, and can achieve the same technical effect. The same part and the beneficial effect are not described in detail here.

It should be noted that the division of units in the embodiment of the present application is for illustration, and is only a logical function division, and there may be another division manner in actual implementation. In addition, each functional unit in each embodiment of the present disclosure may be integrated into one processing unit, each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on this understanding, the essence of the technical solution of the present disclosure or the part that contributes to the related art or all or part of the technical solution can be embodied in the form of a software product, and the computer software product is stored in a storage medium. Several instructions are included to make a computer device (which may be a personal computer, a server, or a network device, etc.) or a processor execute all or part of the steps of the methods described in the various embodiments of the present disclosure. The aforementioned storage medium include: U disk, mobile hard disk, read-only memory (ROM), random access memory (RAM), magnetic disk or optical disk and other medium that can store program codes.

An embodiment of the present disclosure further provides a processor-readable storage medium, where a computer program is stored in the processor-readable storage medium, and the computer program is executed by the processor to perform the foregoing method.

The processor-readable storage medium can be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present disclosure may be provided as methods, systems, or computer program products. Accordingly, the present disclosure may take the form of an entirely hardware embodiment, an entirely software embodiment, or an embodiment combining software and hardware. Furthermore, the present disclosure may take the form of a computer program product embodied on one or more computer-usable storage media (including but not limited to disk storage and optical storage, etc.) having computer-usable program code embodied therein.

The present disclosure is described with reference to flowcharts and/or block diagrams of methods, device (systems), and computer program products according to embodiments of the present disclosure. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing device to produce a machine, so that instructions executed by the processor of the computer or other programmable data processing device produce devices for realizing the functions specified in one or more procedures of a flowchart and/or one or more blocks of a block diagram.

These processor-executable instructions may also be stored in a processor-readable memory capable of directing a computer or other programmable data processing device to operate in a specific manner, such that the instructions stored in the processor-readable memory produce a manufacturing product, the instruction device realizes the function specified in one or more procedures of the flow chart and/or one or more blocks of the block diagram.

These processor-executable instructions can also be loaded onto a computer or other programmable data processing device, causing a series of operational steps to be performed on the computer or other programmable device to produce a computer-implemented processing, so that the instructions executed on the computer or other programmable device provide steps for implementing the functions specified in the flowchart procedure or procedures and/or block diagram procedures or blocks.

Obviously, those skilled in the art can make various changes and modifications to the present disclosure without departing from the spirit and scope of the present disclosure. In this way, if these change and modifications fall within the scope of the claims of the present disclosure and their equivalence, the present disclosure is also intended to include these change and modifications.

What is claimed is:

1. A positioning method, performed by a terminal, comprising:

performing time synchronization with a satellite network;

determining position information of a satellite;

receiving a downlink positioning signal sent by a network equipment of the satellite network;

determining a transmission delay between the satellite and the terminal according to a time synchronization result and the downlink positioning signal;

determining position information of the terminal according to the transmission delay and the position information of the satellite, wherein the performing time synchronization with a satellite network comprises:

receiving time reference information sent by the network equipment through a broadcast message or a dedicated signaling;

calibrating a reference time of a local clock and/or a clock frequency of the local clock of the terminal relative to a reference time of a satellite network and/or a clock frequency of the satellite network, according to the time reference information.

2. The method according to claim 1, wherein the time reference information includes a preset system frame number (SFN) index and time boundary information corresponding to the SFN index.

3. The method according to claim 2, wherein, the calibrating the reference time of the local clock of the terminal according to the time reference information includes:

obtaining the boundary information corresponding to the SFN index according to network reference time information specified by the network equipment;

determining SFN time boundary information corresponding to the local clock of the terminal according to the SFN index;

determining a time offset value according to the boundary information corresponding to the SFN index and the SFN time boundary information corresponding to the terminal;

calibrating the reference time of the local clock of the terminal according to the time offset value.

4. The method according to claim 2, wherein the calibrating the clock frequency of the local clock of the terminal according to the time reference information, includes:

obtaining a first time T1 corresponding to the SFN index N1 of the reference time of the terminal, and obtaining a second time T2 corresponding to the SFN index N2 of the reference time of the terminal;

comparing time difference information between T2 and T1 with time difference information between a reference time corresponding to the SFN index N2 and a reference time corresponding to the SFN index N1 of the network equipment, to adjust the clock frequency of the local clock of the terminal.

5. The method according to claim 4, further comprising:

calculating distance change information between T2 and T1 due to the movement of the satellite according to orbital parameter information of the satellite;

calculating a transmission time difference based on the distance change information;

calibrating the clock frequency of the local clock according to the transmission time difference.

6. The method according to claim 1, wherein the determining the position information of the satellite includes:

receiving ephemeris information of the satellite or satellite position indication information sent by the network equipment;

determining the position information of the satellite according to the ephemeris information or the satellite position indication information.

7. The method according to claim 1, wherein the determining the transmission delay between the satellite and the terminal according to a time synchronization result and the downlink positioning signal includes:

determining a starting time of a sending time of the downlink positioning signal;

determining a local receiving time point for receiving the downlink positioning signal;

determining the transmission delay according to a time difference between the starting time and the local receiving time point.

8. The method according to claim 7, wherein the determining the transmission delay according to the time difference between the starting time and the local receiving time point comprises:

if a sending point of the downlink positioning signal is a ground gateway station, the transmission delay being equal to the time difference between the starting time and the local receiving time point minus the transmission delay between the satellite and the ground gateway station;

if the sending point of the downlink positioning signal is the satellite, the transmission delay being equal to the time difference between the starting time and the local receiving time point.

9. The method according to claim 7, wherein before the determining transmission delay according to the time difference between the starting time and the local receiving time point, the method further comprises:

obtaining a preset signal processing delay;

the determining the transmission delay according to the time difference between the starting time and the local receiving time point includes:

calculating a first difference between the local receiving time point and the starting time, and calculating a second difference between the first difference and the signal processing delay;

the second difference being used as the transmission delay.

10. The method according to claim 1, wherein the downlink positioning signal comprises one of the following signals:

a positioning reference signal;

a broadcast signal;

a downlink reference signal;

a synchronization signal;

a downlink data transmission signal.

11. The method according to claim 1, further comprising:

receiving configuration information sent by the network equipment, wherein the configuration information is used to configure one or more time measurement windows;

the transmission delay including multiple transmission delays between the terminal and the same satellite obtained at multiple times within one time measurement window according to the configuration information, and the position information of the satellite including the position information of the satellite at the multiple times; or the transmission delay including multiple transmission delays between the terminal and the multiple satellites obtained at multiple times within multiple time measurement windows according to the configuration information, the position information of the satellite including position information of the multiple satellites at the multiple times.

12. The method according to claim 1, further comprising:

sending the transmission delay between the satellite and the terminal to the network equipment.

13. A positioning method, performed by a network equipment in a satellite network, comprising:

sending time reference information to a terminal, wherein the time reference information is used to enable the terminal to perform time synchronization with the network equipment;

sending ephemeris information of a satellite to the terminal, wherein the ephemeris information is used to enable the terminal to determine the position information of the satellite;

sending a downlink positioning signal to the terminal, wherein the downlink positioning signal is used to enable the terminal to determine a transmission delay between the satellite and the terminal, wherein the sending time reference information to the terminal comprises:

sending the time reference information to the terminal through a broadcast message or a dedicated signaling, wherein the time reference information is used to enable the terminal to calibrate a reference time of a local clock and/or a clock frequency of the local clock of the terminal relative to a reference time of a satellite network and/or a clock frequency of the satellite network, according to the time reference information.

14. The method according to claim 13, wherein the time reference information includes a preset SFN index and time boundary information corresponding to the SFN index.

15. The method according to claim 13, further comprising:

sending configuration information to the terminal, wherein the configuration information is used to configure one or more time measurement windows, to instruct the terminal to measure signals of multiple satellites within one time measurement window, to obtain position information of multiple satellites at multiple times, and multiple transmission delays between the multiple satellites and the terminal; or instruct the terminal to measure a signal of a same satellite through multiple time measurement windows, to obtain the position of the satellite at multiple times, and the transmission delay between the terminal and the satellite at the multiple times.

16. The method according to claim 13, further comprising:

receiving the transmission delay between the satellite and the terminal sent by the terminal, and determining the position information of the terminal based on the transmission delay and the position information of the satellite.

17. A positioning device, applied to a network equipment in a satellite network, comprising a memory, a transceiver, and a processor, wherein the memory is used to store computer programs; the transceiver is used to send and receive data under the control of the processor; the processor is used to read the computer programs in the memory and perform the positioning method according to claim 13.

18. A positioning device, applied to a terminal, including a memory, a transceiver, and a processor:

the memory is used to store computer programs; the transceiver is used to send and receive data under the control of the processor; the processor is used to read the computer programs in the memory and perform the following operations:

performing time synchronization with a satellite network;

determining position information of a satellite;

receiving a downlink positioning signal sent by a network equipment of the satellite network;

determining a transmission delay between the satellite and the terminal according to a time synchronization result and the downlink positioning signal;

determining position information of the terminal according to the transmission delay and the position information of the satellite, wherein the performing time synchronization with a satellite network comprises:

receiving time reference information sent by the network equipment through a broadcast message or a dedicated signaling;

calibrating a reference time of a local clock and/or a clock frequency of the local clock of the terminal relative to a reference time of a satellite network and/or a clock frequency of the satellite network, according to the time reference information.

* * * * *